(12) United States Patent
Yetzbacher et al.

(10) Patent No.: US 12,474,210 B2
(45) Date of Patent: Nov. 18, 2025

(54) ACTIVE HYPERSPECTRAL IMAGING AND RANGING

(71) Applicant: The Government of the United States of America, as represented by the Secretary of the Navy, Arlington, VA (US)

(72) Inventors: Michael K. Yetzbacher, Burke, VA (US); Samuel D. Park, North Bethesda, MD (US); Vasanthi Sivaprakasam, Silver Spring, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 940 days.

(21) Appl. No.: 17/680,061

(22) Filed: Feb. 24, 2022

(65) Prior Publication Data

US 2022/0276095 A1 Sep. 1, 2022

Related U.S. Application Data

(60) Provisional application No. 63/155,068, filed on Mar. 1, 2021.

(51) Int. Cl.
*G01J 3/45* (2006.01)
*G01J 3/02* (2006.01)
(Continued)

(52) U.S. Cl.
CPC ............... *G01J 3/45* (2013.01); *G01J 3/0205* (2013.01); *G01J 3/021* (2013.01); *G01J 3/2823* (2013.01);
(Continued)

(58) Field of Classification Search
CPC .. G01J 3/45; G01J 3/0205; G01J 3/021; G01J 3/2823; G01J 3/4535; G01J 3/0291;
(Continued)

(56) References Cited

U.S. PATENT DOCUMENTS 6,542,242 B1 * 4/2003 Yost ................... G01N 21/3504
356/438
7,079,254 B2 * 7/2006 Kane .................. G01N 21/4795
356/456
(Continued)

FOREIGN PATENT DOCUMENTS

EP 3760990 A1 * 1/2021 ........... A61B 5/0062
JP H0436632 B2 * 6/1992 .............. C11F 13/16

OTHER PUBLICATIONS

Chen et al., "Multispectral LiDAR point cloud classification: A two-step approach," Remote Sensing, vol. 9, Issue 4, 2017, 17 pages.
(Continued)

*Primary Examiner* — Michelle M Iacoletti
*Assistant Examiner* — Noah J. Haney
(74) *Attorney, Agent, or Firm* — US Naval Research Laboratory; Suresh Koshy

(57) ABSTRACT

Systems and methods for remote sensing in a plurality of dimensions simultaneously are provided. The plurality of dimensions include imaging, spectral sensing, and ranging at a range resolution that is orders of magnitude finer than the native time resolution of a detector used in the system.

16 Claims, 8 Drawing Sheets

(51) Int. Cl.

| | | |
|---|---|---|
| *G01J 3/28* | (2006.01) | |
| *G01J 3/453* | (2006.01) | |
| *G01N 21/17* | (2006.01) | |
| *G01N 21/35* | (2014.01) | |
| *G01N 21/55* | (2014.01) | |
| *G01S 7/486* | (2020.01) | |
| *G01S 17/36* | (2006.01) | |
| *G01S 17/89* | (2020.01) | |

(52) U.S. Cl.
CPC ............ *G01J 3/4535* (2013.01); *G01N 21/35* (2013.01); *G01N 21/55* (2013.01); *G01S 7/486* (2013.01); *G01S 17/36* (2013.01); *G01S 17/89* (2013.01); *G01J 3/0291* (2013.01); *G01J 2003/2826* (2013.01); *G01N 2021/1793* (2013.01); *G01N 2021/3595* (2013.01)

(58) Field of Classification Search
CPC . G01J 2003/2826; G01N 21/35; G01N 21/55; G01N 2021/1793; G01N 2021/3595; G01S 7/486; G01S 17/36; G01S 17/89
USPC .......................................... 356/450, 451, 456
See application file for complete search history.

(56) References Cited

U.S. PATENT DOCUMENTS

| | | | |
|---|---|---|---|
| 7,359,062 B2* | 4/2008 | Chen .................. | A61B 5/0066 356/479 |
| 8,358,420 B1* | 1/2013 | DeWitt .................. | G01J 3/45 356/450 |
| 10,656,017 B2* | 5/2020 | Maurer .............. | G01B 9/02089 |
| 11,119,193 B2* | 9/2021 | Cossairt ................ | G01S 7/4815 |
| 11,867,618 B2* | 1/2024 | Reid ................... | G01N 21/3504 |
| 2003/0128407 A1* | 7/2003 | Chien .................... | H04N 1/04 358/474 |
| 2006/0227316 A1* | 10/2006 | Gatt ...................... | G01S 7/4811 356/5.11 |
| 2013/0193325 A1* | 8/2013 | Phillips .................. | G01J 3/453 250/340 |
| 2017/0059844 A1* | 3/2017 | Sato ...................... | G06T 3/4092 |
| 2018/0262693 A1* | 9/2018 | Yuan ...................... | H04N 25/00 |
| 2018/0309941 A1* | 10/2018 | Lopez ................... | G01J 3/4531 |
| 2020/0037883 A1* | 2/2020 | Islam .................... | G16Z 99/00 |
| 2020/0158855 A1* | 5/2020 | Blanche .............. | G01S 13/9011 |
| 2020/0249088 A1* | 8/2020 | Ifarraguerri .......... | G01N 21/359 |
| 2020/0278256 A1* | 9/2020 | Suzuki .................. | G01J 3/45 |
| 2021/0223105 A1* | 7/2021 | Ideguchi ................. | G01J 3/021 |
| 2021/0382164 A1* | 12/2021 | Bayer ................... | G01S 13/584 |
| 2022/0381677 A1* | 12/2022 | Suzuki .................. | G01N 21/45 |

OTHER PUBLICATIONS

Chen et al., "A 10-nm Spectral Resolution Hyperspectral LiDAR System Based on an Acousto-Optic Tunable Filter," Sensors (Basel), vol. 19, Issue 7, Apr. 4, 2019, 16 pages.

Malkamaki et al., "Portable Hysperspectral lidar utilizing 5 GHz multichannel full waveform digitization," Optics Express, vol. 27, Issue 8, pp. A468-A480, Apr. 15, 2019, 13 pages.

Wagner et al., "Multi-frequency differential absorption LIDAR system for remote sensing of CO2 and H2O near 1.6 mm," Optics Express, vol. 26, 2018, pp. 19420-19434.

Yetzbacher et al., "Spectral restoration for femtosecond spectral interferometry with attosecond accuracy," Journal of the Optical Society of America B, vol. 27, Issue 5, 2010, pp. 1104-1117.

Yetzbacher et al., "Active Fourier Transform Hyperspectral Imaging Using a High-Speed Camera," OSA Optical Sensors and Sensing Congress 2021 (AIS, FTS, HISE, Sensors, ES, 2021, 2 pages.

Snively et al., "Fourier-transorm infrared imaging using a rapid-scan spectrometer," Optics Letters, vol. 24, Issue 24, 1999, pp. 1841-1843.

Lange et al., "Solid-State Time-of-Flight Range camera," IEEE Journal of Quantum Electronics, vol. 37, Issue 3, Mar. 2001, pp. 390-397.

Fienup et al., "Phase retrieval algorithms: a personal tour," Applied Optics, vol. 52, Issue 1, 2013, pp. 45-56.

* cited by examiner

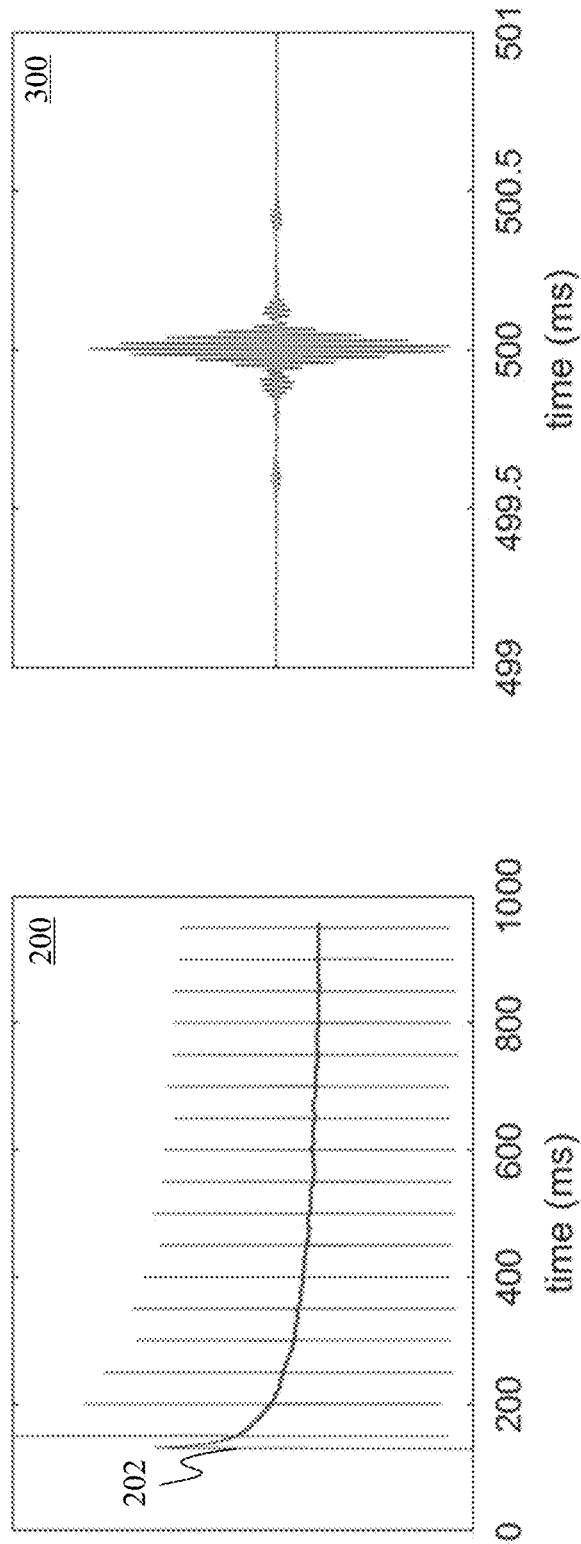

ACTIVE HYPERSPECTRAL IMAGING AND RANGING

CROSS-REFERENCE TO RELATED APPLICATIONS

This application is a non-provisional of and claims the benefit of U.S. provisional application No. 63/155,068, filed on Mar. 1, 2021, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing Navy Case No. 210166-US2.

BACKGROUND

Remote sensing is a process that allows for the detection and monitoring of the physical characteristics of an area, typically by measuring reflected radiation at a distance, for example, from an aircraft or a satellite. For example, multispectral and hyperspectral imaging may be used to detect, classify and identify various materials. Typically, linescanning devices may include two dimensional (2D) focal plane array (FPA) sensors that record an image line where each pixel in an image of a scene has its spectrum dispersed across one dimension of the FPA. Spectral information often allows for a determination of the nature of the objects imaged, making it a valuable remote sensing technique. However, hyperspectral imaging only produces 2D spatial information, and thus has limited utility in identifying objects based on their shape. In addition, while hyperspectral imaging is an increasingly important sensing method for many applications, active systems for multiple wavelengths are uncommon. Often, narrow-band optical filtering is used to remove ambient lighting contributions, and electronic filtering and other processing may be necessary to achieve the required range resolution and remove detector dark current. Duplicating these optical and electronic filtering over multiple channels is challenging and cost-prohibitive for more than a few channels.

Lidar is another remote sensing method that targets an object or scene with a laser and measures the time for the reflected light to return to the receiver to determine the variable distance. A lidar system typically provides a monochromatic three-dimensional (3D) model of a scene, where shape may be used to assist in object identification. The difficulties in lidar are the obvious lack of spectral contrast, and difficulty in assessing brightness of objects in the scene. Most lidar systems are not radiometrically accurate, and have object detection as a goal, rather than accurately measuring the amount or type of reflected light. Lidar detectors often require specialized electronics due to the nanosecond to picosecond timing requirements for ranging with flight.

To date, hyperspectral imaging and lidar information are obtained by distinct hardware that provides data in one dimension. To obtain combined, multi-dimensional information, data fusion may be required. Data fusion, or the combination of data from distinct sensors, is a computationally intensive process and subject to errors in registration and resolution. As a result, measurements of spectral and 3D spatial properties of scenes remain rare, despite their potential use. For example, a full, 3D spatial and spectral characterization of a scene would allow for unambiguous object recognition and identification.

One technique that blends spatial and spectral information is differential absorption lidar (DIAL), which uses multiple wavelengths to identify and locate particular chemical species. However, the two-band limitation has limited the utility of DIAL to remote sensing of atmospheric gases, where narrow resonances can be exploited. The expansion of DIAL techniques into more than a few wavelengths may be possible by dichroic splitting of the lidar signal and by dispersal of the signal onto array detectors. These systems are difficult to align and maintain. Additionally, because of the temporal resolution required for adequate range resolution, the detection electronics remain expensive and the architecture requires duplication of the entire electronic sensing chain for each additional wavelength, prohibiting the use of many wavelengths. Spectral information is typically most valuable when the number of bands falls in the range of 50-200. Therefore, a hyperspectral lidar system is considered out-of-reach with existing technology.

SUMMARY

Methods and systems are provided for remote sensing in a plurality of dimensions simultaneously. The plurality of dimensions include imaging, spectral, and ranging at a range resolution that is orders of magnitude finer than the native time resolution of a detector used in the system.

A system for remote sensing is described herein. The system includes an optical source configured to emit light on a target scene, and an interferometer configured to modulate the light prior to emission on the target scene. The system further includes a detector configured to detect the light emitted on the target scene and generate multiple samples, according to a native time resolution of the detector, based on the detected light to provide remote sensing of the target scene in a plurality of dimensions simultaneously, the plurality of dimensions comprising imaging, spectral sensing, and ranging at a range resolution that is orders of magnitude finer than the native time resolution.

A method for remote sensing is also described herein. The method comprises emitting light on a target scene and modulating the light prior to emission on the target scene. The method further comprising detecting the light emitted onto the target scene with a detector and generating multiple samples, according to a native time resolution of the detector, based on the detected light to provide remote sensing of the target scene in a plurality of dimensions simultaneously, the plurality of dimensions comprising imaging, spectral sensing, and ranging at a range resolution that is orders of magnitude finer than the native time resolution.

Further features and advantages of the invention, as well as the structure and operation of various embodiments are described in detail below with reference to the accompanying drawings.

BRIEF DESCRIPTION OF THE DRAWINGS

FIG. 2 depicts a plot of multiple interferograms.

FIG. 3 depicts a plot of a single interferogram.

DETAILED DESCRIPTION

Definitions

Figure 1:
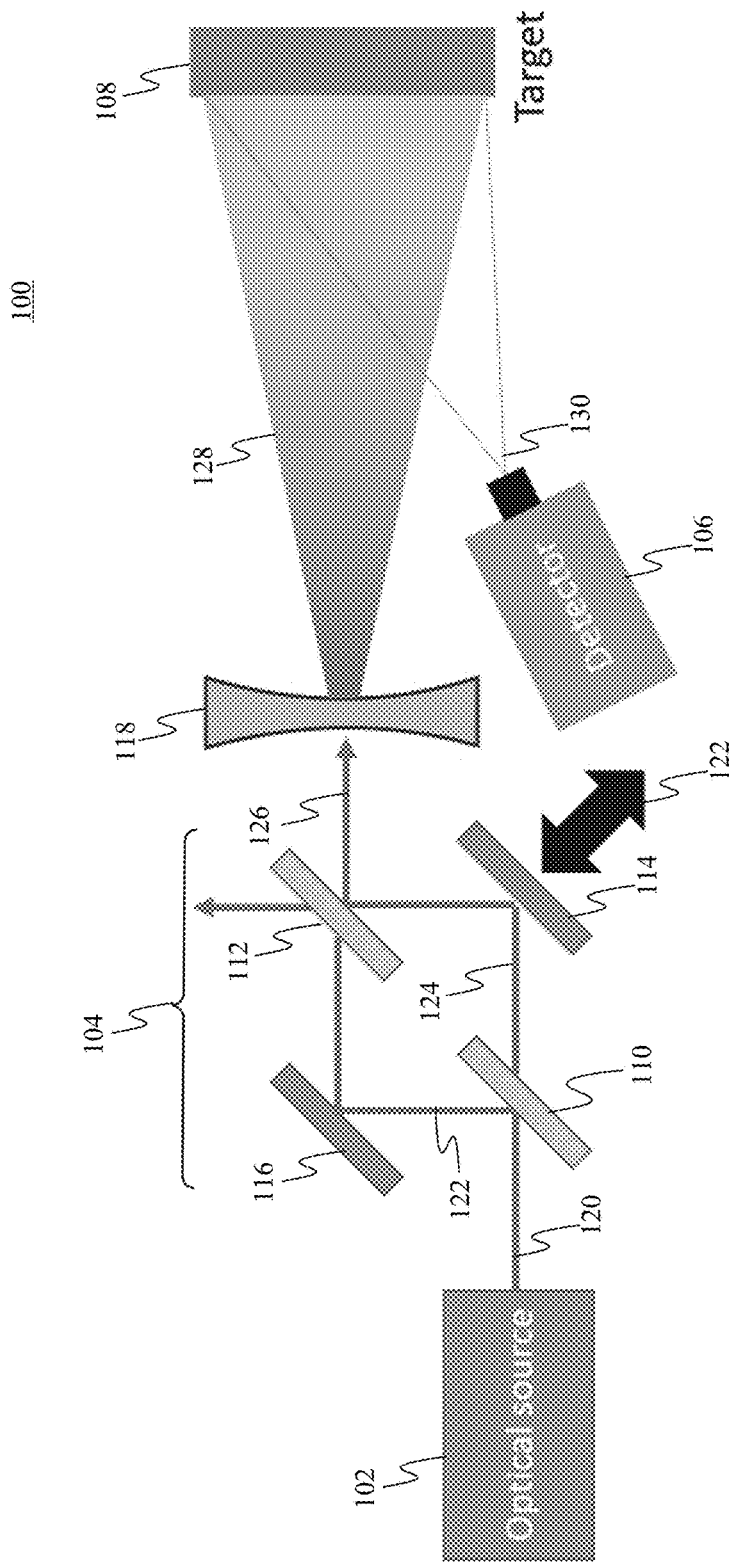
FIG. 1 depicts a simplified system for remote sensing in multiple dimensions simultaneously.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

In describing and claiming the disclosed embodiments, the following terminology will be used in accordance with the definition set forth below.

As used herein, the singular forms "a," "an," "the," and "said" do not preclude plural referents, unless the content clearly dictates otherwise.

As used herein, the term "and/or" includes any and all combinations of one or more of the associated listed items.

As used herein, the term "about" or "approximately" when used in conjunction with a stated numerical value or range denotes somewhat more or somewhat less than the stated value or range, to within a range of ±10% of that stated.

Terminology used herein should not be construed as being "means-plus-function" language unless the term "means" is expressly used in association therewith.

Overview

Fourier transform spectroscopy (FTS) may be utilized for hyperspectral imaging and infrared spectral remote sensing. Due to the time modulation of the FTS signal, this technique has the capability for ranging when using a fast detector. Systems for indirect time-of-flight (ToF) lidar uses modulated monochromatic beams and measure relative phase to derive distance to target. Principles for this measurement are the same as those involved in FTS, and thus the same FTS instrument may be leveraged to measure spectrum and range. Interferometry may produce resolution orders of magnitude finer than the experimental sampling period. Therefore, the megahertz to gigahertz sampling requirements of ToF lidar may be relaxed when using interferometry.

Described herein are methods and systems designed to measure spectrum and range over each pixel in an image of a scene and is capable of imaging hyperspectral lidar at sub-second acquisition rates. This technique demonstrates operationally relevant spectral resolution using commercial-off-the-shelf (COTS) and custom components. This technique utilizes an active hyperspectral imaging architecture that reduces requirements for active stabilization in the FTS interferometer and naturally separates the active hyperspectral signal from passive background without filtering.

EXAMPLE EMBODIMENTS

The systems described herein include two aspects: a remotely sensing Fourier transform spectroscopy system that includes an optical source, modulator, and detector; and the application of phase recovery algorithm(s) to interferogram(s), obtained based on the data from the spectroscopy system, to achieve a range resolution much greater than that allowed by the native electronic sampling rate.

For example, FIG. 1 depicts a simplified system for remote sensing in multiple dimensions simultaneously, according to an example embodiment. System 100 utilizes an active hyperspectral imaging architecture and is configured to provide remote sensing data in multiple dimensions simultaneously: imaging (i.e., X-Y image, first and second dimensions), ranging or distance to target (Z direction, a third spatial dimension), spectral (a fourth dimension), and timing (a fifth dimension). Complete spectral coverage with variable spectral resolution may be provided with the spectral imaging. The range may be determined via phase recovery algorithm(s) with a range resolution that is orders of magnitude finer than the native time resolution. The timing dimension relates to the rapid production of 4D data, i.e., video-rate imaging (e.g., 20-30 frames per second), and is therefore considered a fifth dimension. Thus, timing may be interpreted as rapid 4D imaging. System 100 has the benefit of simple alignment and provides spatial resolution of visible light. System 100 may include an optical source 102, an interferometer 104, and a detector 106, among other components not shown in FIG. 1.

Optical source 102 is configured to emit light on a target scene 108. Optical source 102 may be any optical source suitable for the desired application, such as a bright light bulb, a high-power broadband light source, a laser, etc. For example, when the target scene is far away (e.g., miles away), a laser with high power may be utilized. In another example, a light source with less power intensity may be utilized when the target scene is closer, such as in a lab environment or for a medical application.

Interferometer 102 may be configured to modulate light beam 120 from optical source 102 prior to emission on target scene 108. Such modulation may involve some modification to light beam 120 that is a function of time. Interferometer 102 may be configured in various ways using different optical elements and architectures. For example, interferometer 104 may include a first beam splitter 110 configured to split light beam 120 into light beam 122 and light beam 124. Light beam 122 and light beam 124 may be the same, that is, unmodulated. Interferometer 104 may further include a moving element 122 that is configured to move a reflector 114 in one direction and back in the opposite direction (e.g., back and forth) to modulate light beam 124. Interferometer 104 may also include reflector 116 to keep the two arms of interferometer 104 balanced. Interferometer 104 may include a second beam splitter 112 that is configured to combine light beams 122 and 124 to generate light beam 126, which may be modulated due to the motion of reflector 114. Moving element 122 may be controlled, causing reflector 114 to move accordingly, e.g., to accommodate different sample rates of detector 106 by moving fast or slow. Moving element 122 may be controlled to move with a larger or smaller amplitude to provide variable spectral resolution. The path length of light beam 124 may be longer or shorter than the path length of light beam 122, depending on the motion of reflector 114. As one path becomes longer than the other, the colors of the light beams may be included in light beam 126. At the point at which all paths are equal, the colors will be all be included in light beam 126, at the center point of an interferogram, such as the ones shown in FIGS. 2-3. To vary the spectral resolution, reflector 114 may be moved over short distances to bring the interferograms closer together (corresponding to short and low spectral resolution) or it may be moved over longer distances to spread the interferograms out (corresponding to higher spectral resolution). Depending on the requirements of the application and the detector parameters, reflector 114 may be moved fast to result in less time between the oscillations of the interferogram, or it may be moved more slowly to spread the interferograms out in time to accommodate a slower detector.

Detector 106 is configured to detect light 128 emitted on target scene 108. Detector 106 may be further configured to generate multiple samples, according to a native time resolution of detector 106, based on detected light 130 to provide remote sensing of target scene 108 in a plurality of dimensions simultaneously. Detector 106 may be implemented with a variety of photodetector devices and/or systems, such as photodiodes, camera/imaging sensors, or cameras. Depending on the type of detector utilized in system 100, the plurality of dimensions may include imaging (i.e., X-Y image), spectral sensing, and ranging at a range resolution that is orders of magnitude finer than the native time resolution. For example, the remote sensing may be provided at video rate (e.g., 20-30 frames per second) when detector 106 includes a camera sensor (e.g., a high-speed imaging sensor) and/or camera that collects thousands of frames per second. When a non-imaging detector (e.g., a photodiode) is utilized in system 100, the plurality of dimensions may include spectral sensing and ranging at a high production rate (e.g., video rate or higher) based on collected samples.

System 100 may further include other components, such as folding mirrors or lens 118, configured to condition or shape light beam 126 to generate light beam 128, before it is emitted on target scene 108.

FIG. 2 depicts a plot of multiple interferograms generated based on light reflected/detected from a target scene over 1 second, according to an example embodiment. In FIG. 2, plot 200 shows data from a system, such as system 100, that has an interferometer (e.g., interferometer 104) modulated at a first rate of sampling of 20 Hz (video rate), although a higher rate of modulation is possible. Each spike in plot 200 is an interferogram having independent spectral measurement ($\lambda$ resolution). In an embodiment, the imaging array is 128×80 spatial pixels (X-Y resolution). In an embodiment, the detector (e.g., detector 106 shown in FIG. 1) may be implemented by a high-speed camera that operates at a second rate of sampling of 480 kHz (phase/time and Z resolution). In FIG. 2, trace 202 represents the shutter of the camera detector being opened for timing purposes, with automatic gain control adjusting.

FIG. 3 depicts a plot of single interferogram, in accordance with an example embodiment. FIG. 3 depicts a zoomed-in view of one of the interferograms shown in FIG. 2. FIG. 3 shows a single interferogram 300 corresponding to a single pixel of a camera detector (e.g., detector 106 shown in FIG. 10). Interferogram 300 includes thousands of data points and is centered around 500 millisecond.

Figure 4:
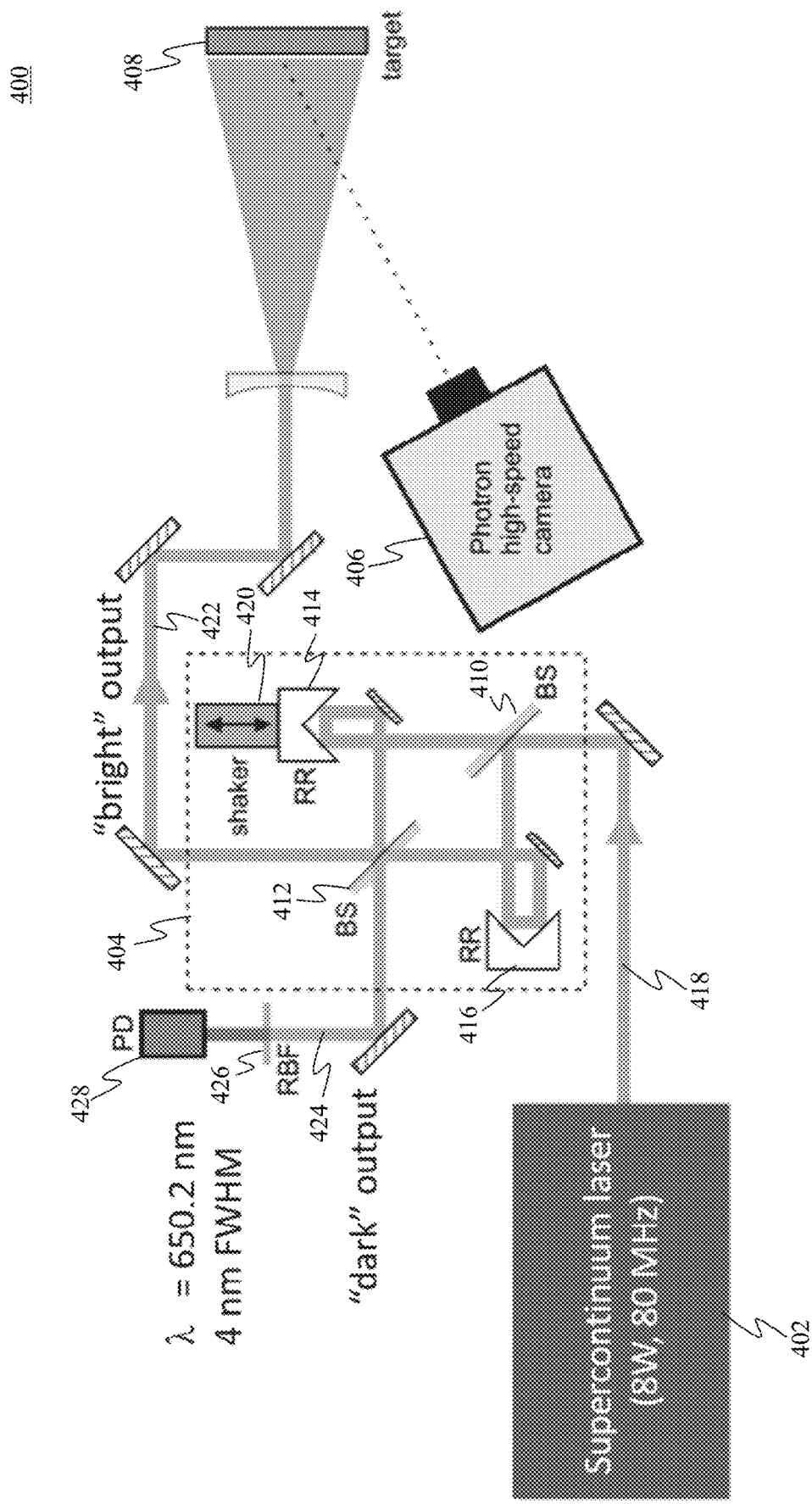
FIG. 4 depicts a system for remote sensing in multiple dimensions simultaneously.

Remote sensing systems may be implemented in various ways. For example, FIG. 4 depicts a system for remote sensing in multiple dimensions simultaneously. System 400 shown in FIG. 4 is similar to system 100 shown in FIG. 1, with more implementation details, according to an example embodiment. As shown in FIG. 4, system 400 is configured to determine imaging, spectral sensing, and ranging simultaneously at video rate. System 400 may be implemented with COTs and/or custom components and may include parts not shown in FIG. 4 (e.g., a processing circuit, system-on-chip (SOC), application-specific integrated circuit (ASIC), etc.). System 400 may be implemented as an integrated system or a distributed system as shown in FIG. 4.

System 400 may include an optical source 402, for example, implemented by a supercontinuum laser (e.g., FIU-15 laser from NKT Photonics™, operating at about 80 MHz repetition rate and 8 W of power). FTS requires broadband sources and lidar requires directed laser light. Supercontinuum laser sources that span the entire visible and near infrared spectrum with Watts of power, and completely cover the spectral response of some detectors, may be utilized in example embodiments. Supercontinuum lasers are pulsed and FTS using pulsed sources must be accomplished with some care regarding the modulation of frequencies, the repetition rate of the laser, and detector exposure time and frame period. As long as the pulse period of the source is short relative to the exposure period of the detector, the source may be treated as if it is a continuous-wave source, and standard FTS data processing may be used. Optical source 402 may include external broadband collimating and sizing optics to aid the beam in moving through an interferometer 404 with maximum beam integrity.

System 400 may include interferometer 404 for modulating light from optical source 402 before it is emitted onto target scene 408. In an example embodiment, detector 406 may be implemented by a high-speed camera that is configured to capture light reflected from target scene 408, in an example embodiment. For example, detector 406 may be implemented by a Photron® FASTCAM SA-Z operating at 480 kHz (2.08 us frame per period) and sampling a 128×80 portion of the array, with the global shutter exposure time set to 1.00 μs. Target scene 408 may be any distance away, but may depend on the intensity of optical source 402. For example, the required intensity/power of the laser may be dependent on the distance to the target, such as the second or fourth power of the distance. In an example embodiment, the distance to target scene 408 may be 1-2 meters from the interferometer output and 1 meter from detector 406, although the location/configuration of the target scene, interferometer output and the detector may vary in an embodiment with separate components. In an integrated system, these components may be collocated.

In example embodiments, interferometer 404 may have a Michelson, Mach-Zehnder, or similar design. With the Mach-Zehnder design, mirrors or reflectors 414, 416, and fold mirrors may be utilized to make the interference robust for scanning required distances while minimizing interferometer area. In an example embodiment, reflectors 414 and 416 may be implemented by trihedral retro-reflectors. In an example embodiment, interferometer 404 may be isolated from ambient vibration by placing it on a platform (e.g., 2'×3' breadboard) raised from a larger optical table by rubber stoppers. Due to the high modulation rate of the light signal, other isolation efforts may not be required. The large optical table may be configured such that it is not isolated from the floor and interferometer 404 may be opened to ambient air currents.

Interferometer 404 may include beamsplitters 410 and 412. Standard beam splitters typically have a wedge design between the front and back surfaces to eliminate residual reflection from the anti-reflection (AR) coated surfaces. With a monochromatic optical source, there is typically no issue with wedged optics. However, with a broadband source, broadband beam contrast may suffer due to the prism effect of wedged optics. That is, when light is emitted on the target scene, each point on the target scene may experience a slightly different illumination spectrum that may cause errors in the spectral recovery. Thin, flat beamsplitters are also commonly used in standard interferometers, but these may suffer from the overlap of multiple reflections from AR coated surfaces, which may significantly affect range information contained in an interferogram. In embodiments, custom, flat (e.g., 12 millimeter thick) beamsplitters may be utilized to separate the spurious reflections from the AR coated surfaces while not suppressing contrast due to prism effects. In example embodiments, beamsplitters 410 and 412 may each have a thickness that is greater than a spatial extent of light beam 418 generated by optical source 402, and a wedge angle that is equal to zero. Flat beamsplitters also provide the benefit that the interferometer is balanced to within the manufacturer's tolerance for beamsplitter thickness, producing symmetric interferograms.

Interferometer 404 enables modulation of light beam 418 from optical source 402 via a moving element 420 ("shaker"). In example embodiments, moving element 420 may be implemented with a stage (e.g., Aerotech® ANT95-L stage) or similar moving mechanism. For the linear regime of modulation, each spectral component of the beam may be modulated at a frequency, $v_m = \Delta_{OPD}/\lambda$, determined by its wavelength, $\lambda$, and the rate of change of the optical path difference, $\Delta_{OPD}$. For speeds where $\Delta_{OPD}$ is of order 10-100 mm/sec, optical wavelengths of 400-1000 nm will appear with modulation frequencies between 10-250 kHz. This overlaps with the capabilities of slow-motion cinematography or motion analysis cameras.

In an embodiment, reflector 414 may be modulated over a 0.6 millimeter mirror position change at a rate of 10 Hz, producing 20 interferograms per second. The complete signal for each interferogram (e.g., interferogram 300 shown in FIG. 3) may be collected in a time less than 10 milliseconds, so more efficient mirror movement may reduce the required measurement time. Movement of the reflector at a speed s, measured as a rate of optical path change per unit time modulates the illumination light for a scene at a rate corresponding to $V_{elec} = sV_{opt}/c = s/\lambda$, where $V_{elec}$ is the electronic modulation frequency corresponding to light of optical frequency, $V_{opt}$, and vacuum wavelength, $\lambda$, and c is the speed of light. In an experiment, the mirror moved at a speed of 326 mm/μs, leading to modulation of 32.6 to 81.5 kHz for light of wavelengths between 400 and 1000 nm. Making an optical measurement of a signal modulated at tens of kHz rates over millisecond times allows for the advantage of "freezing out" most ambient low-frequency vibrational noise associated with Fourier transform spectroscopy. Therefore, the systems and methods described herein do not require any special triggering of the detector or stabilization electronics for the interferometer as are normally found in a Fourier transform spectroscopy instrument. Part of this advantage may only be realized in the collection of spectra that do not have fine spatial structure, that is, solid material targets.

Interferometer 404 is configured to have two outputs, a "bright" output 422 that has constructive interference when the paths are equal, and a "dark" output 424 that has destructive interference when the paths of interferometer 404 are equal. Bright output 422 has maximum and dark output 424 has minimum intensity at the position where interferometer 404 arms are balanced. Dark output 424 may be sent to a filter 426 (e.g., an RBF-red bandpass filter having a center wavelength of 650.2 nm and 4 nm full width half maximum (FWHM)) and then illuminate a photodetector 428 (e.g., a photodiode from Thorlabs® PDA362). In an embodiment, photodetector 428 may be used with 20 dB gain and a −3 dB bandwidth of 1 MHz. The voltage output from photodetector 428 may be sampled at 1 MHz and digitized (e.g., by an oscilloscope) to 14 bits to generate a position reference signal for interferometer 404. Bright output 424 may go through additional beam condition and then is sent downrange to illuminate target scene 408 as described above.

Figure 5:
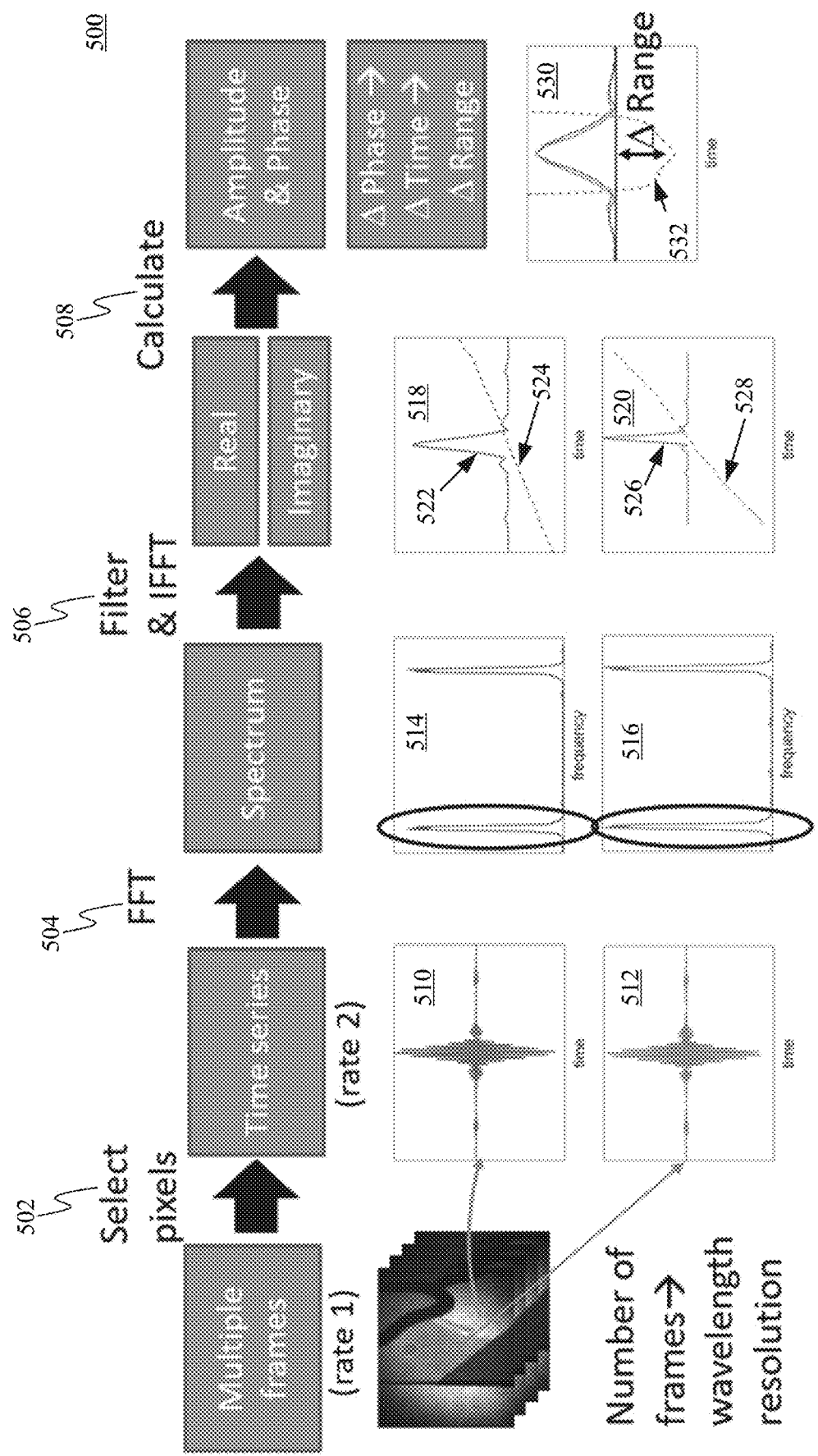
FIG. 5 depicts a flowchart of a method for generating remote sensing data.

FIG. 5 depicts a flowchart of a method for generating remote sensing data. Collected data from a detector (e.g., detector 406 shown in FIG. 4) may be processed and/or analyzed to determine multi-dimensional remote sensing information, such as imaging at video rate, spectral, and ranging. Flowchart 500 shown in FIG. 5 shows a method that may include more or fewer steps in embodiments, depending on the application.

The Fourier transform of the collected data may be determined by techniques that take into account the sampling frequency of the detector (e.g., detector 406 shown in FIG. 4), the length of a time domain series, and the speed of the interferometric modulation. The spectral resolution may be dictated by the mirror motion and may be modified at the time of data capture. The phase of the Fourier transform of the collected data contains information regarding the position of the signal relative to the first sample. In the case that all pixels in the sensing array are exposed simultaneously (such as with a global shutter sensing array), phase differences between pixels encode time delay differences between light returning from various target points in the scene. These time delay differences may be translated via the speed of light and sensing geometry into range information.

For example, in an example embodiment with a camera with an imaging array of 128×80 spatial pixels (X-Y resolution) operating at 480 kHz (phase/time/Z resolution), the range resolution may be determined to be 100-1000 times better than the time sampling interval (i.e., deviations in center of profile can be very accurately known) as follows. For a given camera frame rate, f, the native time resolution of the system, $\tau_0 = f c/2$, where c is the speed of light and the factor of 2 comes from the round trip made from the remote sensing system to the target scene. For the 480 kHz frame rate used here, the native time resolution is approximately 2 μs (1/480 kHz), which corresponds to a range resolution of approximately 300 meters. However, because the Fourier transform is an oscillating signal, it has a time-domain phase that can be known, usually to much better than the native time resolution. One or more custom or standard phase recovery algorithms intended for high accuracy may be used to determine a phase, which contains information regarding the range. (e.g., as described in "Spectral restoration for femtosecond spectral interferometry with attosecond accuracy" by Yetzbacher et al., JOSA B 27, 1104-1117 (2010), and is hereby incorporated by reference in its entirety, or "Phase retrieval algorithms: a personal tour," Appl. Opt. 52, 45-56 (2013) by J. R. Fienup) The accuracy of phase recovery is linked to the range resolution achievable by the remote sensing system. Phase recovery algorithms may have a phase recovery accuracy that may be as small as 1 milliradian for 16-bit data with good signal-to-noise ratio. The phase accuracy may be used to estimate the effective time resolution τ, via the relation $\tau = \tau_o \delta\phi p$, where $\delta\phi$ is the fractional phase accuracy and p is the number of samples per fringe in the interferogram. The relative above suggests that a time resolution of 1 ns, corresponding to a range resolution of approximately 0.3 meters may be achieved with approximately six samples per fringe and 1 milliradian phase accuracy. While the concept of phase accuracy and range resolution may be demonstrated in "indirect-time-of-flight" lidar systems, the phase accuracy of milliradian level is not traditionally achieved for these systems.

As shown in FIG. 5, in an embodiment, multiple frames (e.g., 480 thousand frames in one second) may be captured by the camera and only a subset of these frames are used for further processing. The method shown in FIG. 5 may include the following steps. In step 502, a couple of pixels may be selected, and interferograms 510 and 512 may be generated for the pixels, such that a single pixel corresponds to one interferogram. In step 504, Fast Fourier Transform (FFT) may be applied to each interferogram to generate the spectrum of light that created the interferogram. Fourier transformed spectra are shown in plots 514 and 516. There are two copies of the spectrum, corresponding to positive and negative frequencies, shown in each of plots 514 and 516. Thus, in step 506, a filter and inverse FFT may be applied to the Fourier transformed spectra to retain only one copy of each spectrum for each pixel and generate a complex result, with amplitude 522 and 526, and phase 524 and 528, as respectively shown in plots 518 and 520. In step 508, calculations are performed using the amplitude and phase information, to determine phase offset timing and/or range. The phase offset provides timing information, where the interferogram appears in time, as shown in plot 530, which shows an enlarged, central portion of the curves in plots 518 and 520 superimposed on one another. Line 532 shown in plot 530 provides the phase offset as the difference between the curves in plots 518 and 520.

Figure 6:
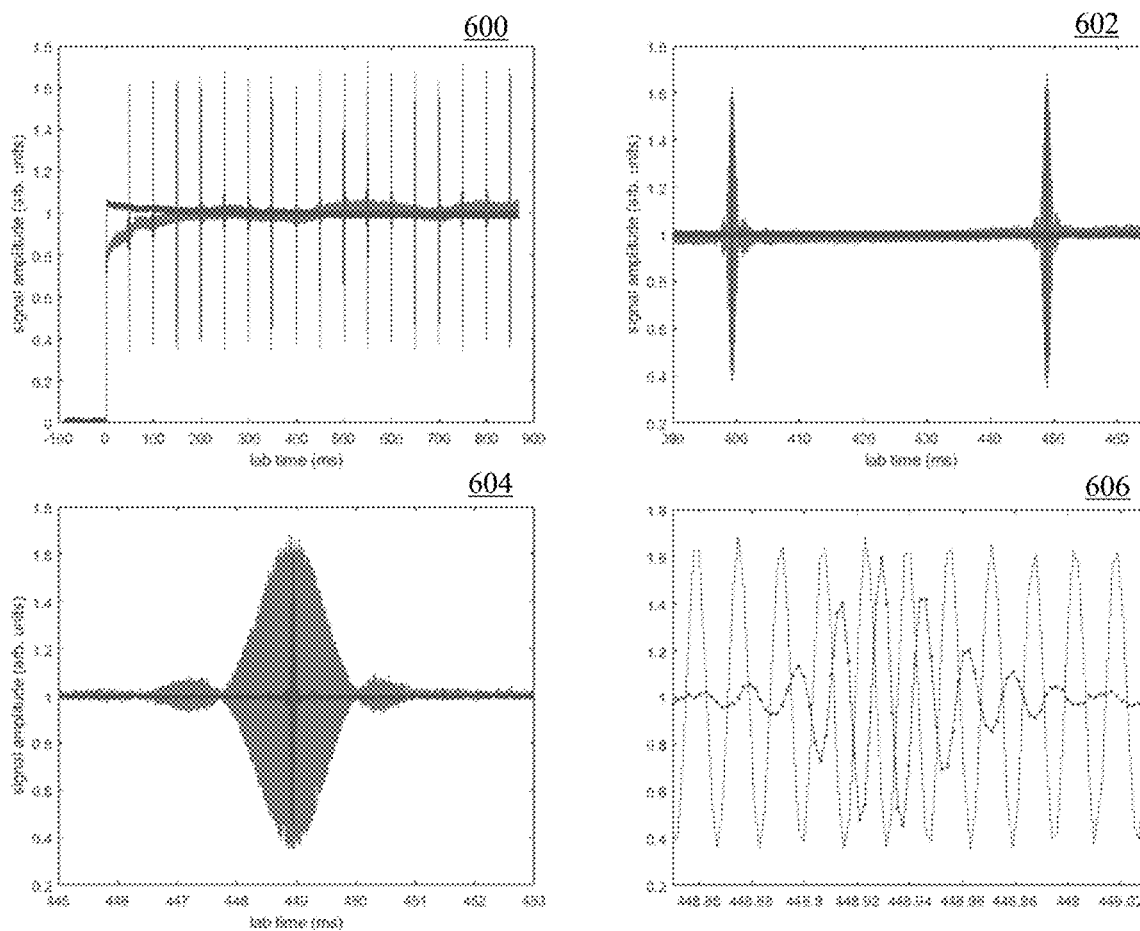
FIG. 6 depicts plots showing outputs of an interferometer.

In an example embodiment in which a photodiode (e.g., photodetector 428 shown in FIG. 4) is utilized, its output may be utilized in a number of ways, for example, as a reference signal, co-addition or interpolation strategies. FIG. 6 depicts plots showing outputs of an interferometer (e.g., interferometer 404 shown in FIG. 4). The two separately recorded signals ("bright" and "dark" outputs) of an interferometer may be synchronized using a shutter to provide a single reference point and matching the spacing of the interferogram centers. Various timescales are shown in FIG. 6 to give an example of the duration of the signal. The timescales and parameters presented here are by no means absolute limitations of FTS, or of the system architecture. Rather, the scan timescales provide 6-10 samples per optical period of the interferometric signal at a convenient rate for the camera employed in this example embodiment. The 6-10 samples per period criterion is not a rule arising from FTS, but does provide good meter to sub-meter ranging resolution using known phase recovery algorithms.

In all the plots of FIG. 6, the photodiode signal is normalized and plotted in light gray, and a spatial binning of several pixels from a scan of a broadband spectral return (white target) is shown in dark gray. Plots 600, 602, 604 and 606 show progressive zooming of the same data. In plot 600, a full second of data is collected, and plot 600 shows the shutter opening and 17 interferograms. The interferometer is modulated at 10 Hz, producing approximately 20 interferograms per second. In plot 602, interferograms 8 and 9 from the series of plot 600 are shown. One is a forward scan, and one is a backward scan. Note the asymmetry in the eight interferogram, which comes from the nonuniform motion of the moving element. A moving element that has more consistent motion may produce more symmetric interferograms. In plot 604, the ninth interferogram is shown, which is nearly symmetric. The difference in duration is due to the differences in the width of the spectrum. In plot 606, the central fringes show that the white-light interferogram is only about 65 μs in duration, as defined by the full width at half-maximum.

Figure 7:
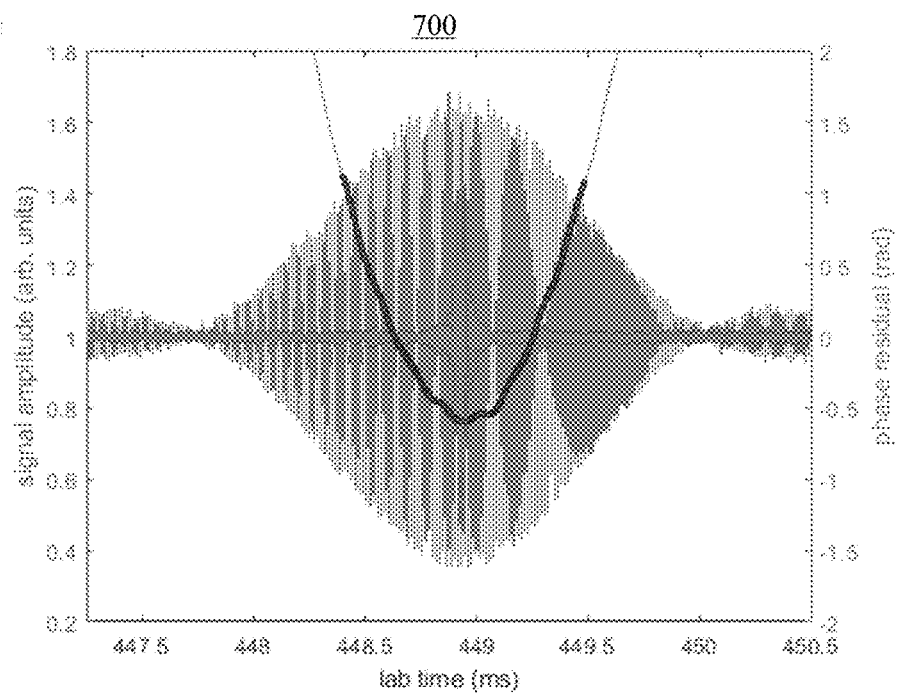
FIG. 7 depicts a plot showing how a position reference signal may be utilized in the system of FIG. 4.

FIG. 7 depicts a plot showing how a position reference signal may be utilized to determine mirror speed and signal frequency for the camera interferogram, for example, with system 400. Monitoring the position reference signal is a common technique in FTS. Often it is used to trigger the detector to ensure uniform time sampling. When the detector is a closed system with its own internal timing and triggering, the sample timing may be difficult or impossible to control. In this case, it is possible to use position reference information to monitor and adjust for the uncontrolled motion of the moving element, as shown in FIG. 7. The central portion of interferogram nine (shown in plot 604 of FIG. 6) is shown in FIG. 7 with the residual time-domain phase of the dark output. The phase is recovered through a modified Hilbert transform that includes Fourier transformation, filtering the signal peak and inverse Fourier transformation. The recovered phase contains information regarding the instantaneous mirror speed, and the slope of the phase can be directly related to the expected signal modulation. This information may be used to calibrate the Fourier transform axis for the camera data. This is important, as the Fourier transform that generates the spectrum from the camera data is a numerical procedure and no spectral information can be gained without knowledge of the expected signal modulation. FIG. 7 shows the residual phase from a linear fit. The quadratic nature of this residual indicates that the mirror is accelerating during the approximately 1 millisecond in which the signal appears. For high accuracy ranging information, the phase of the interferogram must be corrected for this acceleration. In example embodiments, the average speed may be utilized to calibrate the wavelength axis and enable accurate spectral recovery. In FIG. 7, the camera interferogram is shown as dark gray, the photodiode interferogram is shown as light gray, and the residual time-domain phase of the dark output is shown in black. The photodiode interferogram is treated with a known phase recovery algorithm to determine its phase. The phase slope is directly related to the mirror speed and expected signal frequency. The mirror speed is common to both camera and photodiode signals since they arise from the same interferometer.

Figure 8:
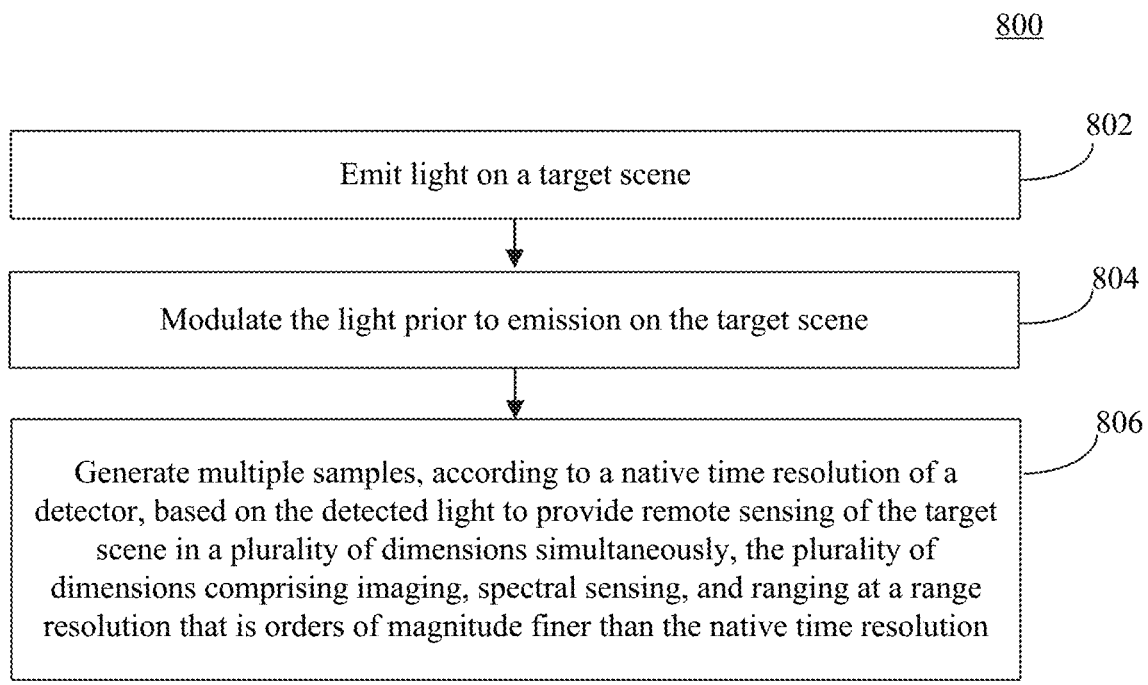
FIG. 8 depicts a flowchart of a method for remote sensing.

The systems described herein, such as system 100 and system 400 respectively shown in FIG. 1 and FIG. 4, may operate in various ways. For example, FIG. 8 depicts a flowchart 800 of a method for remote sensing, that may be implemented with any of these systems. Flowchart 800 begins with step 802, in which light is emitted on a target scene. The light may be generated by an optical source suitable for the application. In step 804, the light may be modulated prior to emission on the target scene, for example, via an interferometer as described above. In step 806, multiple samples may be generated, according to a native time resolution of a detector (e.g., detector 106 or 406 shown in FIG. 1 or 4), based on the detected light to provide remote sensing of the target scene in a plurality of dimensions simultaneously, the plurality of dimensions comprising imaging, spectral sensing, and ranging at a range resolution that is orders of magnitude finer than the native time resolution.

Flowchart 800 may include more or fewer steps than the ones shown in FIG. 8 in example embodiments. For example, flowchart 800 may include another step of using a phase recovery algorithm to determine the range resolution. In addition, the imaging (i.e., X-Y imaging) may be provided at video rate (e.g., 20-30 frames per second). The method further includes controlling a moving element to move a reflector to provide variable spectral resolution; utilizing a high-speed imaging sensor to detect the light emitted onto the target scene; capturing the emitted light to be utilized as a reference signal via a photodiode; and conditioning the light prior to emission on the target scene.

The systems and methods described herein have the advantage of being the first to combine very accurate phase recovery with interferometric spectroscopy signals and can thus achieve ranging and spectral information in the same system. While a camera implementation for the detector is described above, a non-imaging system may also be realized with a different detector. Non-imaging systems have the advantage of very rapid time sampling. Thus, a non-imaging system may achieve the highest range resolution for a given modulation speed. The systems may be flexibly configured with an imaging configuration and/or a non-imaging configuration. For example, a non-imaging, hyperspectral lidar may be used to interrogate portions of an image produced with a standard imaging camera to provide spectral information.

Additional advantages provided by the methods and systems described herein include simultaneous measurement of information in multiple dimensions, including spectral properties, ranging at range resolution that is orders of magnitude finer than the native time resolution, imaging at video rate, and timing. The spectrum and range measurement of each pixel in a scene may be made quickly (e.g., milliseconds) for imaging detectors and even faster with non-imaging detectors. The spectral resolution is adjustable with operating parameters. This technique may be used to probe solid, liquid, or gaseous state targets with a simple, easy to implement architecture. Furthermore, the spectral range produced may be limited by the choice of detector and sampling rate, but is not limited by the architecture.

The methods and systems described herein allow a choice of spectral band, such as visible-band, ultraviolet or infrared bands without modification other than a change in the detector and/or source. Additionally, the optical signal may be split and sensed by multiple detectors in multiple bands. Different ranges to target are possible, such as long range targets using lasers with greater power, microscopic applications by suitable adjustment of scanning speed, or anything in between.

Additional Embodiments

Systems and methods described herein may generate a number of remote sensing measurements at a high level of accuracy. For example, an experiment was conducted to assess the accuracy of the spectral recovery and the results are provided in FIGS. 9-11.

Figures 9, 10:
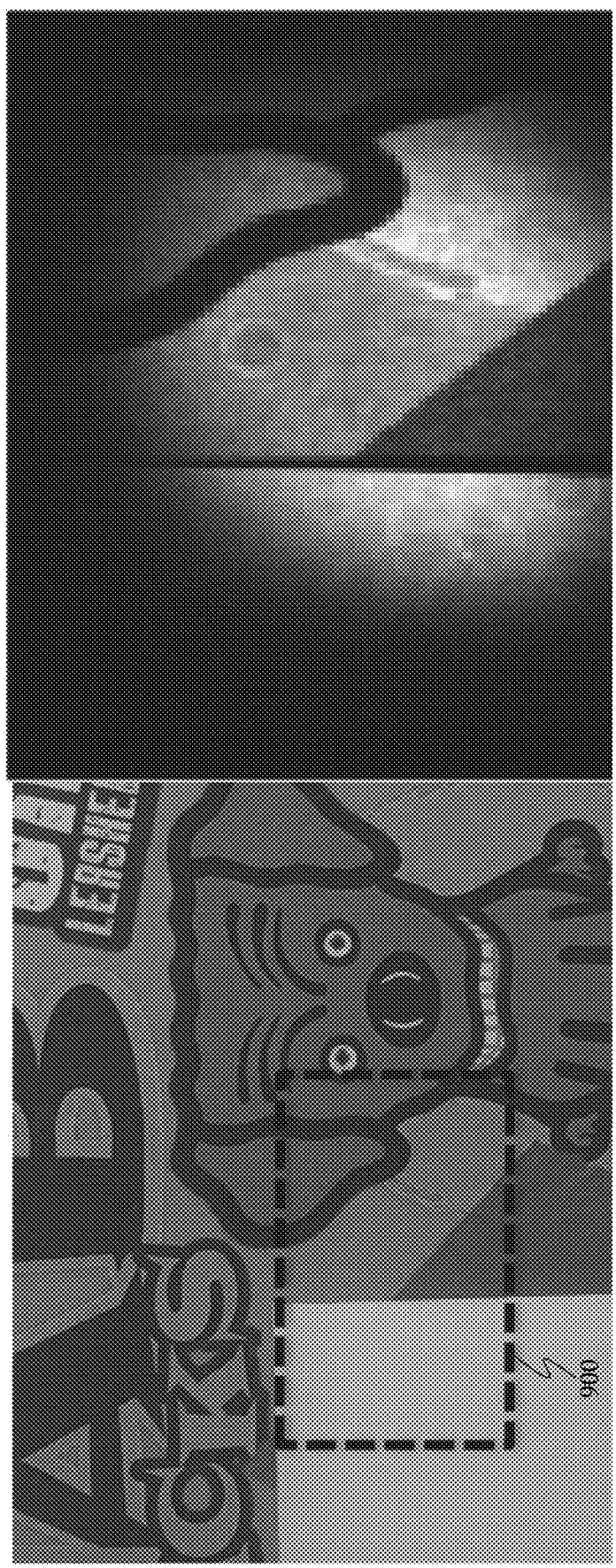
FIG. 9 depicts a test scene image.
FIG. 10 depicts a panchromatic image captured by a camera detector.

FIG. 9 depicts a test scene image. In this experiment, output from the interferometer was expanded using a singlet concave BK7 lens to cover an area on a target displaying variety in reflectance spectra. The test scene image originally includes color, and the red, green, blue, yellow and white areas are non-uniformly illuminated by an expanded laser spot to enable the simultaneous capture of imagery. In FIG. 9, dotted box 900 represents the extent of the field of view of the camera.

FIG. 10 depicts a panchromatic image captured by a camera detector, derived from approximately 1000 frames (approximately 2 milliseconds of data). In this experiment, the target is around 1 meter from the camera lens. The configuration of the components and/or the type of components may depend on the desired application.

Spectra of various areas of the test scene were collected with a grating spectrometer (Ocean Optics® 2000+) that had been radiometrically calibrated in a laboratory setting. Spectra were obtained by using an opaque screen to block all the illumination but a 10 millimeter diameter spot centered on each color area. The beam steering was not changed, but the opaque screen and its aperture were moved to illuminate different areas. The 10 millimeter spot was fully contained within each uniform area when data was recorded. The spectrometer input fiber was placed in proximity to the illuminated area and 100 spectra with 7 nanosecond integration time were summed and stored for each area. A dark spectrum was also recorded and subtracted. For this comparison, the spectra were then treated with a relative sensitivity function that multiplies the spectra and converts to the separately measured sensitivity curve of the Photron® camera system. This curve, defined between 400-1000 nanometer, contains contributions from the lens and fiber transmission, grating efficiency, and relative response of the two detectors.

Figure 11:
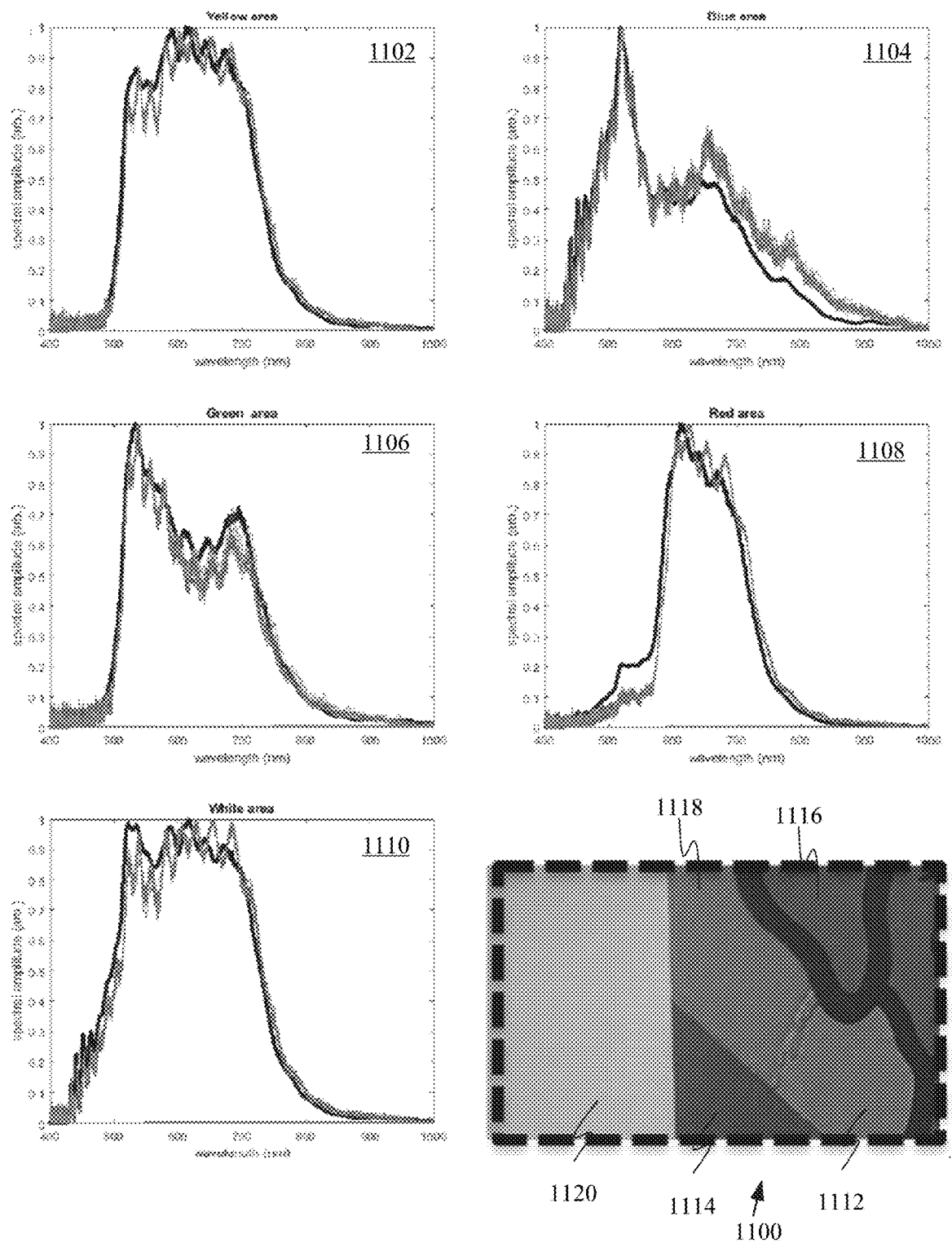
FIG. 11 depicts plots of spectra recovered using the system of FIG. 4 in comparison with spectra obtained using a spectrometer.

The FTS data for the scene in FIG. 9 were collected over 1 second while shaking the interferometer mirror at 10 Hz, resulting in 16 interferograms in the interval. FIG. 11 depicts plots of spectra recovered using the system of FIG. 4 in comparison with spectra obtained using a spectrometer. The interferograms were spatially binned in software to increase signal-to-noise ratio (SNR). The number of camera pixels binned for each region is shown in Table 1 below. Spectral signals were binned averages of multiple pixels. The number of pixels and estimated signal-to-noise enhancement are also shown for each region.

TABLE 1

Pixel formats for each area of test scene image of FIG. 9.

| Area | Area format | Number of pixels | SNR enhancement |
| --- | --- | --- | --- |
| Red | 19 × 13 | 247 | 16 |
| Green | 7 × 18 | 126 | 11 |
| Blue | 16 × 11 | 176 | 13 |
| Yellow | 18 × 16 | 288 | 17 |
| White | 15 × 35 | 525 | 23 |

In order to be displayed in wavelength, the spectra from Fourier transformation have been multiplied by a Jacobian factor of $(\Delta_0/\Delta)^2$, where $\Delta_0$ is a reference wavelength of 600 nanometer. For each interferogram, 8192 of the central points were selected and Fourier transformed. Signals were mean subtracted and apodized using a window filtering out the first and last approximate third of the window before Fourier transformation.

In FIG. 11, image 1100 is originally a color portion of the test scene image shown in FIG. 9 that is sensed by the camera. Thus, image 1100 has a white area 1120, a yellow area 1112, a blue area 1114, a green area 1116 and a red area 1118. FIG. 11 further includes plots of the spectra of these various areas of image 1100. Accordingly, plot 1102 shows the spectra of yellow area 1112. Plot 1104 shows the spectra of blue area 1114. Plot 1106 shows the spectra of green area 1116. Plot 1108 shows the spectra of red area 1118. Plot 1110 shows the spectra of white area 1110. In each of the plots shown in FIG. 11, the truth spectra are scaled with the camera's spectral sensitivity function and plotted with a thick black line that are superimposed on the FTS spectra. The accuracy and precision of the FTS spectra in the plots of FIG. 11 show that the described remote sensing technique provides good results, even for visible-band spectra. Though the SNR has been enhanced by the spatial binning described here, qualitatively correct spectra are obtained from even single-pixel data. Current industry standards typically allow for 5%-10% variation in radiometric accuracy for field measurements, and this system can support that level of accuracy, especially if averaging multiple interferograms.

CONCLUSION

While various embodiments of the disclosed subject matter have been described above, it should be understood that they have been presented by way of example only, and not limitation. Various modifications and variations are possible without departing from the spirit and scope of the described embodiments. Accordingly, the breadth and scope of the disclosed subject matter should not be limited by any of the above-described exemplary embodiments.

What is claimed is:

1. A system for remote sensing, comprising:
an optical source configured to emit light on a target scene, the target scene comprising target points;
an interferometer configured to produce a time-domain interferogram and to modulate the light at modulation frequencies prior to emission on the target scene; and
a detector comprising an imaging array, said imaging array comprising spatial pixels, said detector being configured to capture the interferogram, the captured interferogram comprising samples encoding modulation frequencies of the light modulated by the interferometer and time delay differences between light returning from the target points onto the spatial pixels, said detector comprising a frame rate, the frame rate being sufficient to enable said detector to detect the modulation frequencies up to half of the frame rate, said detector configured to
detect the light emitted on the target scene, and
generate multiple samples based on the detected light to provide remote sensing of the target scene in a plurality of dimensions simultaneously, the plurality of dimensions comprising imaging, spectral sensing, and ranging the target points, the ranging being determined by the time delay differences between the spatial pixels being translated into ranged distances to the target points.

2. The system of claim 1,
wherein said detector comprises a native time resolution,
wherein the captured interferogram comprises a number of fringes in a time domain, each fringe of the number of fringes comprising a number of samples,
wherein the ranging comprises a range resolution, the range resolution corresponding to an effective time resolution, the effective time resolution being different from the native time resolution, the effective time resolution being determined in part from a phase recovery accuracy and the number of samples for the each fringe.

3. The system of claim 1, wherein the remote sensing of the target scene in a plurality of dimensions is provided at video rate.

4. The system of claim 1, wherein the interferometer comprises a beamsplitter having a thickness greater than a spatial extent of an optical beam generated by the optical source and a wedge angle that is equal to zero.

5. The system of claim 1, wherein the interferometer further comprises a moving element configured to move a reflector to provide variable spectral resolution.

6. The system of claim 1, wherein the detector comprises a high-speed imaging sensor.

7. The system of claim 1, wherein the system is configured to operate in the visible and near-infrared range.

8. The system of claim 1, further comprising a photodetector configured to capture the emitted light to be utilized as a reference signal for the interferometer.

9. The system of claim 1, further comprising beam condition optics configured to condition the light prior to emission on the target scene.

10. A method for remote sensing, comprising:
emitting light on a target scene, the target scene comprising target points;
modulating the light at modulation frequencies with an interferometer prior to emission on the target scene and producing a time-domain interferogram;
detecting the light emitted onto the target scene with a detector, the detector comprising an imaging array, the detector capturing the interferogram, the captured interferogram comprising samples encoding modulation frequencies of the light modulated by the interferometer and time delay differences between light returning from the target points onto the spatial pixels, the detector comprising a frame rate, the frame rate being sufficient to enable the detector to detect the modulation frequencies up to half of the frame rate; and
generating multiple samples based on the detected light to provide remote sensing of the target scene in a plurality of dimensions simultaneously, the plurality of dimensions comprising imaging, spectral sensing, and ranging the target points, the ranging being determined by the time delay differences between the spatial pixels being translated into ranged distances to the target points.

11. The method of claim 10, further comprising:
wherein the detector comprises a native time resolution,
wherein the captured interferogram comprises a number of fringes in a time domain, each fringe of the number of fringes comprising a number of samples,
wherein the ranging comprises a range resolution, the range resolution corresponding to an effective time resolution, the effective time resolution being different from the native time resolution, the effective time resolution being determined in part from a phase recovery accuracy and the number of samples for the each fringe.

12. The method of claim 10, wherein the remote sensing of the target scene in a plurality of dimensions is provided at video rate.

13. The method of claim 10, further comprising:
controlling a moving element to move a reflector to provide variable spectral resolution.

14. The method of claim 10, further comprising:
utilizing a high-speed imaging sensor to detect the light emitted onto the target scene.

15. The method of claim 10, further comprising:
capturing the emitted light to be utilized as a reference signal.

16. The method of claim 10, further comprising:
conditioning the light prior to emission on the target scene.

* * * * *